United States Patent
Wang et al.

(10) Patent No.: US 10,762,150 B2
(45) Date of Patent: Sep. 1, 2020

(54) SEARCHING METHOD AND SEARCHING APPARATUS BASED ON NEURAL NETWORK AND SEARCH ENGINE

(71) Applicant: Beijing Baidu Netcom Science And Technology Co., Ltd., Beijing (CN)

(72) Inventors: Xinyu Wang, Beijing (CN); Di Jiang, Beijing (CN); Lei Shi, Beijing (CN); Chen Li, Beijing (CN); Meng Liao, Beijing (CN); Jingzhou He, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 575 days.

(21) Appl. No.: 15/625,460

(22) Filed: Jun. 16, 2017

(65) Prior Publication Data

US 2018/0150561 A1     May 31, 2018

(30) Foreign Application Priority Data

Nov. 28, 2016   (CN) .......................... 2016 1 1071564

(51) Int. Cl.
*G06F 16/9535*   (2019.01)
*G06F 16/248*   (2019.01)
(Continued)

(52) U.S. Cl.
CPC ........... *G06F 16/9535* (2019.01); *G06F 7/08* (2013.01); *G06F 16/248* (2019.01);
(Continued)

(58) Field of Classification Search
CPC ........... G06F 16/9535; G06F 16/24575; G06F 16/248; G06F 7/08; G06N 3/04; G06N 3/0454; G06N 3/08
See application file for complete search history.

(56) References Cited

U.S. PATENT DOCUMENTS

| | | | | |
|---|---|---|---|---|
| 8,122,011 B1 * | 2/2012 | Garg | ................... | G06F 16/3322 707/721 |
| 2004/0254920 A1 * | 12/2004 | Brill | .................... | G06F 16/9535 |

(Continued)

FOREIGN PATENT DOCUMENTS

| | | |
|---|---|---|
| CN | 102637171 A | 8/2012 |
| CN | 102955821 A | 3/2013 |

OTHER PUBLICATIONS

Chinese Patent Application No. 201611071564.X, Office Action dated Aug. 20, 2019, 7 pages.

(Continued)

*Primary Examiner* — Jensen Hu
(74) *Attorney, Agent, or Firm* — Lathrop GPM LLP

(57) ABSTRACT

A searching method and a searching apparatus based on a neural network and a search engine are disclosed, the searching method including: acquiring a query and a pre-query input by a user; acquiring a plurality of search results according to the query; generating a target term vector representation according to the query, the pre-query and the plurality of search results based on an MLP; and forecasting the target term vector representation based on a semantic model of a deep neural network so as to acquire a plurality of s optimized search results corresponding to the query.

17 Claims, 5 Drawing Sheets

(51) Int. Cl.
  *G06F 16/2457* (2019.01)
  *G06N 3/04* (2006.01)
  *G06F 7/08* (2006.01)
  *G06N 3/08* (2006.01)

(52) U.S. Cl.
  CPC ......... *G06F 16/24575* (2019.01); *G06N 3/04* (2013.01); *G06N 3/0454* (2013.01); *G06N 3/08* (2013.01)

(56) References Cited

U.S. PATENT DOCUMENTS

| | | | | |
|---|---|---|---|---|
| 2006/0064411 | A1* | 3/2006 | Gross | G06F 16/90324 |
| 2010/0268710 | A1* | 10/2010 | Strehl | G06F 16/3326 |
| | | | | 707/732 |
| 2014/0149399 | A1* | 5/2014 | Kurzion | G06F 16/9535 |
| | | | | 707/723 |
| 2014/0280179 | A1* | 9/2014 | Coleman | G06F 16/3323 |
| | | | | 707/740 |
| 2015/0293976 | A1* | 10/2015 | Guo | G06F 16/248 |
| | | | | 707/706 |

OTHER PUBLICATIONS

Chinese Patent Application No. 201611071564.X, English translation of Office Action dated 20, 2019, 8 pages.

\* cited by examiner

SEARCHING METHOD AND SEARCHING APPARATUS BASED ON NEURAL NETWORK AND SEARCH ENGINE

CROSS-REFERENCE TO RELATED APPLICATION

The present application is based upon and claims priority to Chinese Patent Application No. 201611071564.X, filed on Nov. 28, 2016, the entirety contents of which are incorporated herein by reference.

FIELD

The present disclosure relates to a field of search engine technology, and more particularly to a searching method and a searching apparatus based on a neural network and a search engine.

BACKGROUND

With the rapid development of search engine technology and living demands for people, an increasing number of users pay attention on a search experience, which depends on a correlation between search results and intents for searching. In other words, the greater the correlations between the search results and the intents are, the greater the matching degrees between the search results and the requirements of the users are.

In a searching process, a user inputs a query, and the search engine returns search results matching to the query. The query may be a text including one or more search terms or phrases. The search engine may return the search results matching to the query by matching to the text.

In related arts, there are various sememes included in requirement description of the query input by the user or the sememes are wide, such that the search engine may misunderstand the intent of the query input by the user, leading to a low accuracy of the search result.

SUMMARY

Embodiments of the present disclosure seek to solve at least one of the problems existing in the related art to at least some extent.

Accordingly, a first objective of the present disclosure is to provide a searching method based on a neural network. With the method provided by the present disclosure, a personal requirement of the user may be satisfied in a maximal degree, accuracy of the search result may be improved and a searching experience of the user may be improved significantly.

A second objective of the present disclosure is to provide a searching apparatus based on a neural network.

A third objective of the present disclosure is to provide a search engine.

A fourth objective of the present disclosure is to provide an electric device.

A fifth objective of the present disclosure is to provide a non-transitory computer readable storage medium.

A sixth objective of the present disclosure is to provide a computer program product.

In order to achieve the above objectives, embodiments of a first aspect of the present disclosure provide a searching method based on a neural network. The searching method includes: acquiring a query and a pre-query input by a user; acquiring a plurality of search results according to the query; generating a target term vector representation according to the query, the pre-query and the plurality of search results based on an MLP (Multi-layer Perceptron); and forecasting the target term vector representation based on a semantic model of a deep neural network so as to acquire a plurality of optimized search results corresponding to the query.

In order to achieve the above objectives, embodiments of a second aspect of the present disclosure provide a searching apparatus based on a neural network. The apparatus includes: a first acquiring module, configured to acquire a query and a pre-query input by a user; a second acquiring module, configured to acquire a plurality of search results according to the query; a generating module, configured to generate a target term vector representation according to the query, the pre-query and the plurality of search results based on an MLP; and a forecasting module, configured to forecast the target term vector representation based on a semantic model of a deep neural network so as to acquire a plurality of optimized search results corresponding to the query.

In order to achieve the above objectives, embodiments of a third aspect of the present disclosure provide a search engine, including the searching apparatus according to the second aspect of the disclosure.

In order to achieve the above objectives, embodiments of a fourth aspect of the present disclosure provide an electronic device, including: a processor; a memory for storing instructions executable by the processor, in which the processor is configured to acquire a query and a pre-query input by a user; to acquire a plurality of search results according to the query; to generate a target term vector representation according to the query, the pre-query and the plurality of search results based on an MLP; and to forecast the target term vector representation based on a semantic model of a deep neural network so as to acquire a plurality of optimized search results corresponding to the query.

In order to achieve the above objectives, embodiments of a fifth aspect of the present disclosure provide a non-transitory computer readable storage medium for storing instructions that, when executed by one or more processors of a mobile terminal, cause the mobile terminal to perform the searching method according to the embodiments of the first aspect of the present disclosure. The method including: acquiring a query and a pre-query input by a user; acquiring a plurality of search results according to the query; generating a target term vector representation according to the query, the pre-query and the plurality of search results based on an MLP; and forecasting the target term vector representation based on a semantic model of a deep neural network so as to acquire a plurality of optimized search results corresponding to the query.

In order to achieve the above objectives, embodiments of a sixth aspect of the present disclosure provide a computer program product, when the instructions in the computer program product are executed by the processor, executing the searching method based on the neural network. The method includes: acquiring a query and a pre-query input by a user; acquiring a plurality of search results according to the query; generating a target term vector representation according to the query, the pre-query and the plurality of search results based on an MLP; and forecasting the target term vector representation based on a semantic model of a deep neural network so as to acquire a plurality of optimized search results corresponding to the query.

Additional aspects and advantages of embodiments of present disclosure will be given in part in the following descriptions, become apparent in part from the following

DETAILED DESCRIPTION

Figure 1:
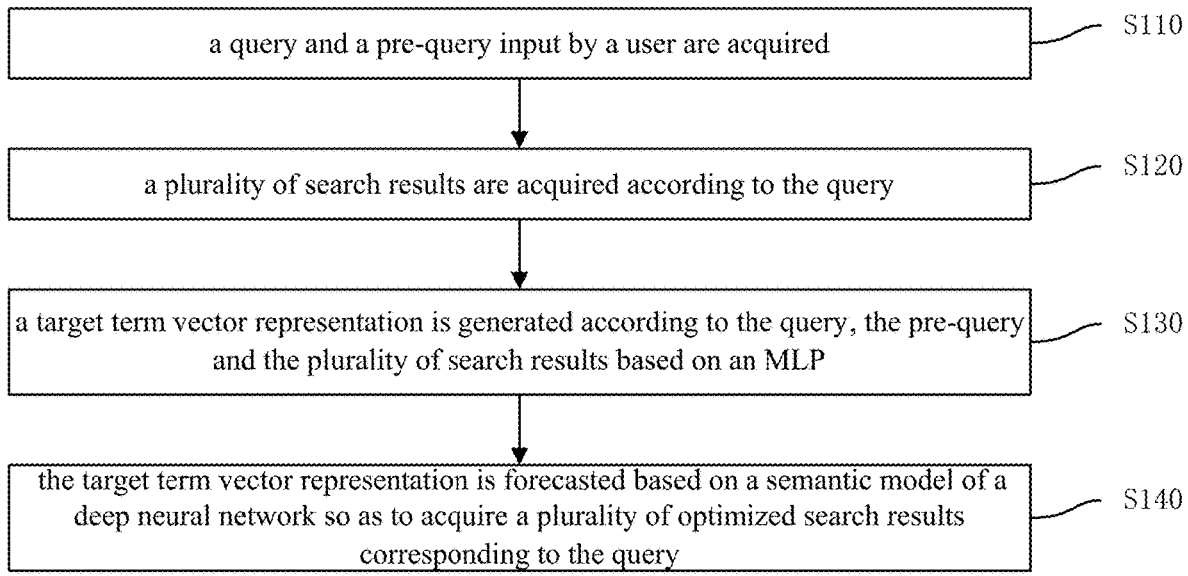
FIG. 1 is a flow chart of a searching method based on a neural network according to an embodiment of the present disclosure.

Reference will be made in detail to embodiments of the present disclosure, where the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

The searching method and the searching apparatus based on the neural network, and a search engine according to embodiments of the present disclosure will be described with reference to drawings.

At present, an optimized demand of traditional personal search and user's search needs to construct complicated and costly user profiles. In addition, a series of matching is desired to provide recommendations, which is expensive. There is a lack of an industry practice to describe the intent and interest of a query input by the user from a semantic perspective. A machine learning method based on a neural network has obtained a better effect on webpages ordering through a long-term discussion and research. However, in a personal searching aspect, there is still a lack of practical applications for the neural network.

As a basic component of the search engine, an existing ordering model is only able to order the queries and candidate files in a searching process. A pre-query input by the user and results clicked or omitted by the user in a pre-querying process may be excluded completely from ordering factors of the model in a new searching process. However, information such as the pre-query and the results clicked or omitted by the user in the pre-querying process may also provide desirable information related to the query of the user so as to acquire a result matching to the query better.

Accordingly, a searching method based on a neural network is provided by the present disclosure. By combining the pre-query, the query and the search results of the query, and by extracting a target term vector representation for indicating user's short-term interest based on MLP, an optimized search result may be acquired according to the target term vector representation, such that a personal requirement of the user may be satisfied in a maximal degree.

Specifically, FIG. 1 is a flow chart of a searching method based on a neural network according to an embodiment of the present disclosure. It should be noted that the searching method based on the neural network according to embodiments of the present disclosure may be applied in a searching apparatus based on the neural network according to embodiments of the present disclosure, and the searching apparatus based on the neural network according to embodiments of the present disclosure may be applied in a search engine.

As shown in FIG. 1, the searching method includes the following acts.

In block S110, a query and a pre-query input by a user are acquired.

It should be noted that the pre-query is a previous query of the query in embodiments of the present disclosure. In other words, the query and the pre-query are two queries in two successive search requests, in which the query is a query in a current search request, and the pre-query is a query in a search request previous to the current search request.

For example, it is assumed that the searching method based on the neural network according to embodiments of the present disclosure may be applied in a search engine providing an input box for the user to input the query. When the user inputs the query and clicks "search", the query in the current search request input by the user and the pre-query in the previous search request input by the user are acquired.

The query and the pre-query may be numbers, letters, texts and symbols or combinations thereof. For example, the query may be "movies acted by Dehua Liu in 2015", and the pre-query may be "which movies does Dehua Liu act".

In block S120, a plurality of search results are acquired according to the query.

For example, resources such as files or webpages matching to the query are searched for and the resources are regarded as the search results of the query, in which the matching may be understood as a precise matching firstly and a fuzzy matching thereafter. In other words, the resources matching precisely to the query and the resources matching faintly to the query may be retrieved as the search results.

In block S130, a target term vector representation is generated according to the query, the pre-query and the plurality of search results based on an MLP.

Specifically, the target term vector representation may be extracted from the query and the pre-query and the search results via the MLP, in which the target term vector representation may represent user's short-term interest.

Figure 2:
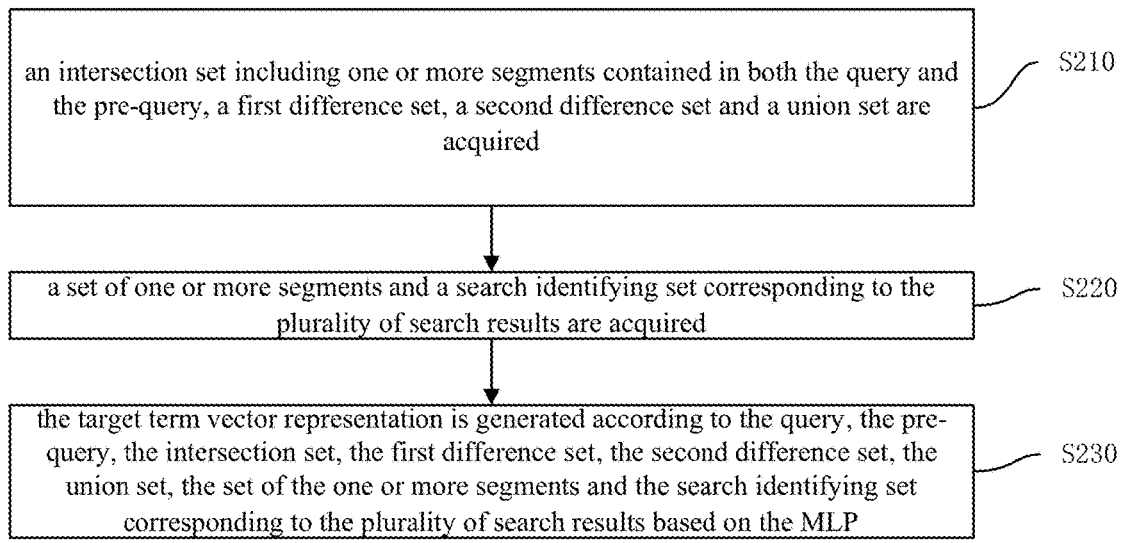
FIG. 2 is a flow chart of generating a target term vector representation according to embodiments of the present disclosure.

As an example, as shown in FIG. 2, generating a target term vector representation according to the query, the pre-query and the plurality of search results based on an MLP also includes following acts.

In block S210, an intersection set including one or more segments contained in both the query and the pre-query, a first difference set including one or more segments contained in the query but not contained in the pre-query, a second difference set including one or more segments contained in the pre-query but not contained in the query and a union set including one or more segments contained in the query or the pre-query are acquired.

Specifically, a segmentation may be performed on the query so as to acquire first segments and performed on the pre-query so as to acquire second segments. The intersection set including one or more segments contained in both the query and the pre-query, the first difference set including one or more segments contained in the query but not contained in the pre-query, the second difference set including one or more segments contained in the pre-query but not contained in the query and the union set including one or more segments contained in the query or the pre-query are acquired thereafter according to the first segments and the second segments.

For example, assume that the query is "which movies does Dehua Liu cooperate with Zhilin Guan to act" and the pre-query is "which actresses does Dehua Liu cooperate with to act movies". The segmentation is performed on the query and the pre-query so as to acquire a first segment set {Dehua Liu, Zhilin Guan, cooperate with, act, which, movies} and a second segment set {Dehua Liu, which, actresses, cooperate with, act, movies}. Therefore, the intersection set is {Dehua Liu, cooperate with, act, which, movies}, the first difference set is {Zhilin Guan}, the second difference set is {actresses} and the union set is {Dehua Liu, Zhilin Guan, cooperate with, act, which, movies, actresses}.

In block S220, a set of one or more segments and a search identifying set corresponding to the plurality of search results are acquired, in which the search identifying set is configured to indicate whether the plurality of search results are comprised in a click set of the pre-query, a non-click set of the pre-query or a non-display set of the pre-query.

It may be understood that the plurality of search results include several webpage documents each having a title. The segmentation may be performed on the titles corresponding to the search results respectively to acquire a segment set, and whether the search results exist in the click set of the pre-query, the non-click set of the pre-query or the non-display set of the pre-query may be determined.

If the search results exist in the click set of the pre-query, it may be understood that the search results may also correspond to the pre-query and may be checked by the user for view. If the search results exist in the non-click set of the pre-query, it may be understood that the search results may also correspond to the pre-query but may not be checked by the user for view. If the search results exist in the non-display set of the pre-query, it may be understood that the search results may not correspond to the pre-query.

In block S230, the target term vector representation is generated according to the query, the pre-query, the intersection set, the first difference set, the second difference set, the union set, the set of the one or more segments and the search identifying set corresponding to the plurality of search results based on the MLP.

Specifically, the target term vector representation may be extracted according to the query, the pre-query, the intersection set, the first difference set, the second difference set, the union set, the set of the one or more segments and the search identifying set corresponding to the plurality of search results via the MLP.

Figure 3:
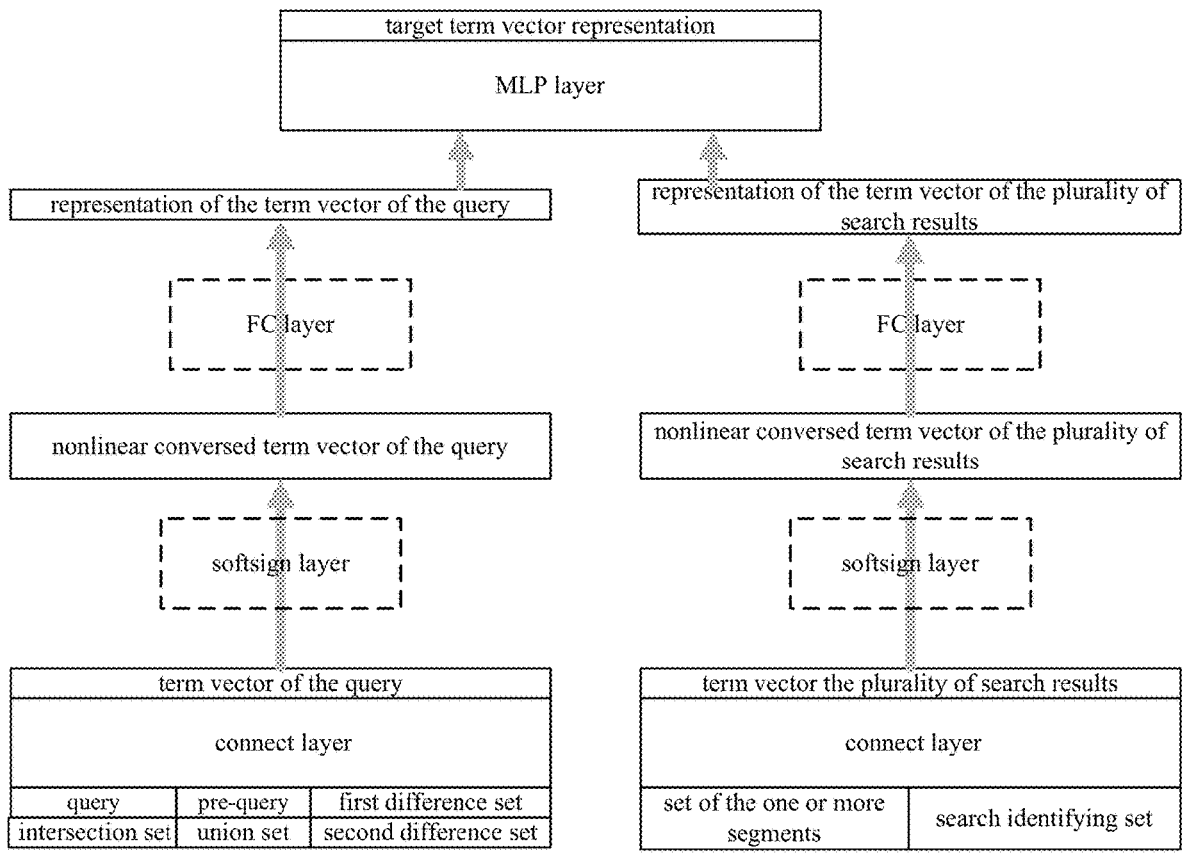
FIG. 3 is a schematic diagram of generating a target term vector representation according to embodiments of the present disclosure.

As an example, the MLP may include a connect layer, a softsign layer, an FC layer (full connection layer) and an MLP layer. In this example, as shown in FIG. 3, block S230 may include following acts.

In block S231, the query, the pre-query, the intersection set, the first difference set, the second difference set and the union set are connected as a term vector of the query via the connect layer.

Specifically, the query, the pre-query, the intersection set, the first difference set, the second difference set and the union set are regarded as parameters, and the parameters are connected via the connect layer as a term vector of the query.

In block S232, a nonlinear conversion is performed on the term vector of the query via the softsign layer, and a full connection is performed on a nonlinear converted term vector of the query thereafter via the FC layer so as to generate a representation of the term vector of the query.

In block S233, the set of the one or more segments and the search identifying set corresponding to the plurality of search results are connected as a term vector of the plurality of search results via the connect layer.

In block S234, the nonlinear conversion is performed on the representation of the term vector of the plurality of search results via the softsign layer, and the full connection is performed on a nonlinear converted term vector of the plurality of search results via the FC layer thereafter so as to generate a representation of the term vector of the plurality of search results.

In block S235, the target term vector representation is generated according to the representation of the term vector of the query and the representation of the term vector of the plurality of search results via the MLP layer.

In other words, the query, the pre-query, the intersection set, the first difference set, the second difference set and the union set may be connected as a term vector of the query via the connect layer, and the representation of the term vector of the query may be generated via the FC layer according to the term vector of the query undergoing the nonlinear conversion by means of the softsign layer. At the same time, the set of the one or more segments and the search identifying set corresponding to the plurality of search results may be connected as a term vector of the plurality of search results via the connect layer, and the representation of the term vector of the plurality of search results may be generated via the softsign layer and the FC layer. Finally, the target term vector representation may be generated according to the representation of the term vector of the query and the representation of the term vector of the plurality of search results via the MLP layer.

Therefore, by considering the intersection set, the first difference set, the second difference set, the union set, the set of the one or more segments and the search identifying set corresponding to the plurality of search results, the personal searching of the pre-query may be realized based on the MLP and the personal requirement of the user may be satisfied in a maximal degree.

In block S140, the target term vector representation is forecasted based on a semantic model of a deep neural network so as to acquire a plurality of optimized search results corresponding to the query. The semantic model of a deep neural network (DNN) may be understood as a semantic model trained by using the deep neural network technology.

Specifically, the target term vector representation may be regarded as the ordering information of the query, such that scores may be provided by introducing ordering information of the query into a semantic model based on DDN technology, and the search results are sequenced from highest score to lowest score so as to obtain the optimized search results in a certain order. In other words, after the search results of the query are acquired, the search results of the query are optimized according to the query and the pre-query via the MLP, such that optimized search results of the query may be acquired. Thus, the search results and orders of the query matching to user's short-term interest may be acquired by taking advantages of the neural network on semantic understanding.

With the searching method based on the neural network according to embodiments of the present disclosure, the query and the pre-query input by the user may be acquired, the plurality of search results may be acquired according to the query, the target term vector representation may be generated thereafter according to the query, the pre-query and the plurality of search results based on an MLP, and finally, the target term vector representation may be forecasted based on a semantic model of a deep neural network so as to acquire the plurality of optimized search results corresponding to the query. In other words, a search optimizing may be performed on the query according to the pre-query, and the search result and an order of the query matching the user's short-term requirement may be acquired using an advantage of the neural network on semantic understanding, such that a personal requirement of the user may be satisfied in a maximal degree, accuracy of the search result may be improved and a searching experience of the user may be improved significantly.

Figure 4:
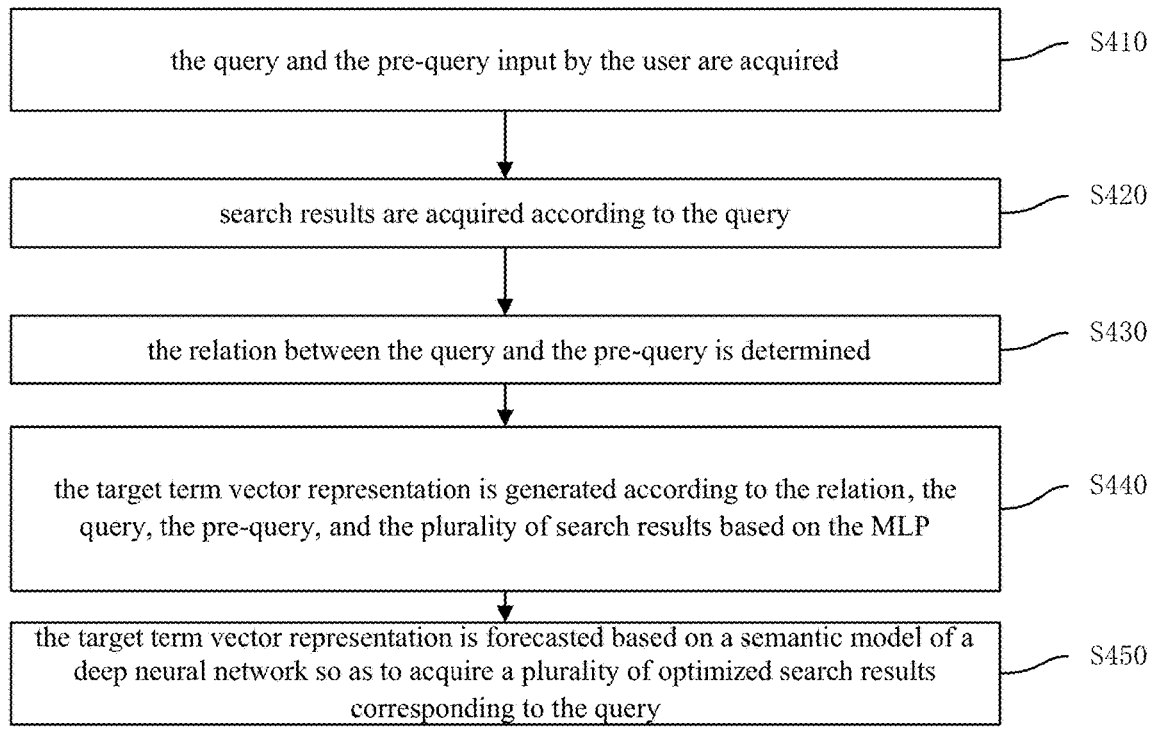
FIG. 4 is a flow chart of a searching method based on a neural network according to another embodiment of the present disclosure.

FIG. 4 is a flow chart of a searching method based on a neural network according to another embodiment of the present disclosure.

In order to improve the accuracy of the searching results and to acquire the better effect of personal searching, the relation between the query and the pre-query may be determined based on the MLP, and the target term vector representation may be generated according to the relation, the query, the pre-query and the search results. Finally, the target term vector representation is forecasted based on the semantic model of the deep neural network so as to acquire the plurality of optimized search results corresponding to the query. Specifically, as shown in FIG. 4, the searching method may include following acts.

In block S410, the query and the pre-query input by the user are acquired.

In block S420, search results are acquired according to the query.

In block S430, the relation between the query and the pre-query is determined.

In order to perform the search optimizing using the pre-query of the user, it should be noted that the relation between the pre-query and the query may be classified into four categories:

1) changing type: there is no difference between the semanteme of the query and that of the pre-query. For the relation in the changing type, regardless of whether links displayed in the search results of the pre-query are clicked or not clicked in last searching, the user may be not inclined to click the links in this searching.

2) specialization type: on a basis of the pre-query, the user may narrow a searching range by performing a specialization on the user's search requirements. For the relation in the specialization type, the user may have interest in search results more related to the semanteme in the current searching theoretically.

3) generalization type: the user may summarize the pre-query and search a query with a wider semanteme. The difference of the relation in the generalization type from the relation in the specialization type is that the user's prefer-ence is not clear but theoretically the user may not have interest in the search results more related to the semanteme in the previous searching.

4) common topic requirement type: the current searching and the previous searching maybe in a common topic. In the search results of the common topic, search results in conformity with both the current search requirement and the previous search requirement may satisfy the user's short-term personal requirement.

Thus, context information may be classified in the present disclosure, which means that the relation between the pre-query and the query are classified into one of the four types mentioned above. In a practical application, which type does the relation between the pre-query and the query belong may be determined firstly, so as to improve the personal search optimizing in combination with this type.

In block S440, the target term vector representation is generated according to the relation, the query, the pre-query, and the plurality of search results based on the MLP.

It may be understood that the relation between the pre-query and the query are classified into one of the four types mentioned above in the present disclosure, and whether the search results of the pre-query are clicked or not is judged. Thus, there are eight categories in total, by combining the training network of the neural network and information on the pre-query, the ordering of displayed results may be affected differently by the specific training and learning mode of model network for each category.

Therefore, after the type of the relation between the query and the pre-query is determined, the target term vector representation corresponding to this type may be extracted according to the query, the pre-query, and the plurality of search results based on the MLP.

As an example, as shown in FIG. 2, generating a target term vector representation according to the query, the pre-query and the plurality of search results based on an MLP includes following acts.

In block S210, an intersection set including one or more segments contained in both the query and the pre-query, a first difference set including one or more segments contained in the query but not contained in the pre-query, a second difference set including one or more segments contained in the pre-query but not contained in the query and a union set including one or more segments contained in the query or the pre-query are acquired.

In block S220, a set of one or more segments and a search identifying set corresponding to the plurality of search results are acquired, in which the search identifying set is configured to indicate whether the plurality of search results are comprised in a click set of the pre-query, a non-click set of the pre-query or a non-display set of the pre-query.

In block S230, the target term vector representation is generated according to the query, the pre-query, the intersection set, the first difference set, the second difference set, the union set, the set of the one or more segments and the search identifying set corresponding to the plurality of search results based on the MLP.

As an example, the MLP comprises a connect layer, a softsign layer, an FC layer and an MLP layer. In this example, block S230 may also include following acts.

In block S231), the query, the pre-query, the intersection set, the first difference set, the second difference set and the union set are connected as a term vector of the query via the connect layer.

In block S232), a nonlinear conversion is performed on the term vector of the query via the softsign layer, and a full connection is performed on a nonlinear converted term vector of the query via the FC layer so as to generate a representation of the term vector of the query.

In block S233), the set of the one or more segments and the search identifying set corresponding to the plurality of search results are connected as a term vector of the plurality of search results via the connect layer.

In block S234), the nonlinear conversion is performed on the term vector of the plurality of search results via the softsign layer, and the full connection is performed on a nonlinear converted term vector of the plurality of search results via the FC layer so as to generate a representation of the term vector of the plurality of search results.

In block S235), the target term vector representation is generated according to the representation of the term vector of the query and the representation of the term vector of the plurality of search results via the MLP layer.

In block S450, the target term vector representation is forecasted based on a semantic model of a deep neural network so as to acquire a plurality of optimized search results corresponding to the query.

With the searching method based on the neural network according to embodiments of the present disclosure, the relation between the query and the pre-query may be determined, the target term vector representation may be generated according to the relation, the query, the pre-query and the plurality of search results based on an MLP, and finally, the target term vector representation may be forecasted based on a semantic model of a deep neural network so as to acquire the plurality of optimized search results corresponding to the query. In other words, many pieces of information of hide layer are provided according to the semantic model of DDN technology and more available ordering bases may be provided for different kinds of pre-queries, such that accuracy of the search result may be improved and a searching experience of the user may be improved significantly.

Figure 5:
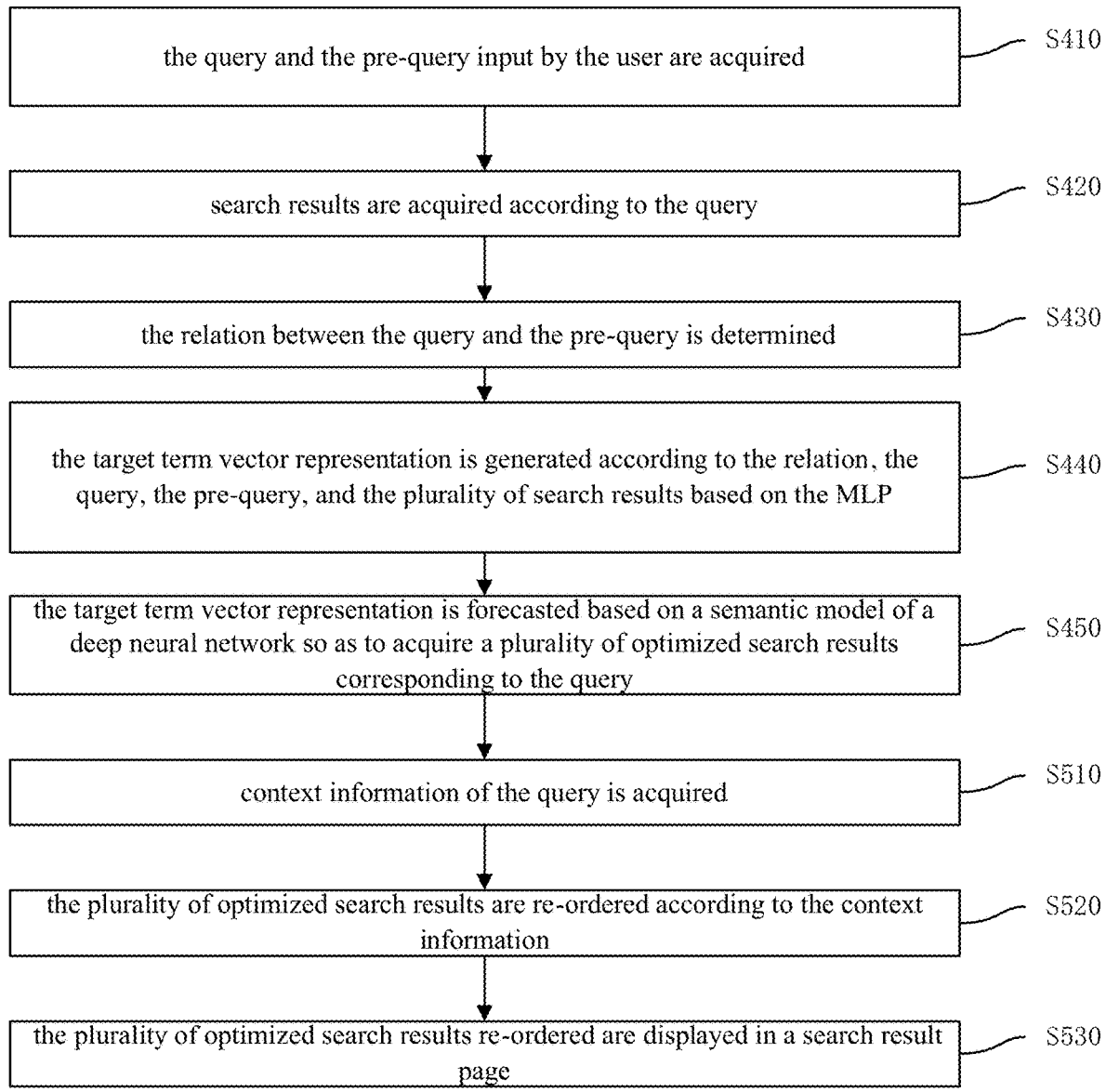
FIG. 5 is a flow chart of a searching method based on a neural network according to yet another embodiment of the present disclosure.

In order to improve the experience for the user and to acquire the better effect of personal search optimizing, in embodiments of the present disclosure, as shown in FIG. 5, the searching method may also include following acts after the optimized search results corresponding to the query are acquired.

In block S510, context information of the query is acquired.

In block S520, the plurality of optimized search results are re-ordered according to the context information.

For example, relevancies between the search results and the context information may be computed, and the optimized search results may be re-ordered according to the relevancies. For example, the optimized search results may be re-ordered from highest relevancy to lowest relevancy.

In block S530, the plurality of optimized search results re-ordered are displayed in a search result page.

Thus, by re-ordering and displaying the search results in combination with the context information, the personal searching of the user with the pre-query may be optimized, such that the experience of the user may be improved.

Figure 6:
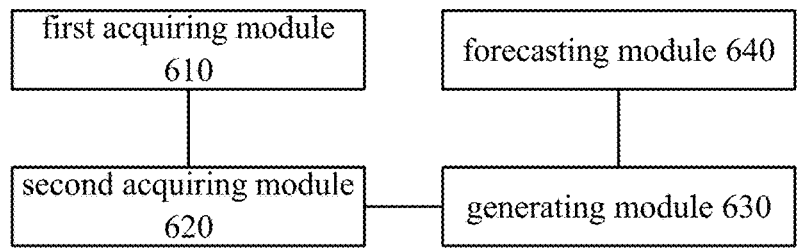
FIG. 6 is a block diagram of a searching apparatus based on a neural network according to an embodiment of the present disclosure.

Accordingly, the present disclosure also provides a searching apparatus based on a neural network. Since the searching method described above corresponds to the searching apparatus, the implementations of searching method may be applied in the searching apparatus, which will not be described in detail. FIG. 6 is a block diagram of a searching apparatus based on a neural network according to an embodiment of the present disclosure. As shown in FIG. 6, the searching apparatus includes a first acquiring module 610, a second acquiring module 620, a generating module 630, a forecasting module 640.

Specifically, the first acquiring module 610 is configured to acquire a query and a pre-query input by a user.

The second acquiring module 620 is configured to acquire a plurality of search results according to the query.

The generating module 630 is configured to generate a target term vector representation according to the query, the pre-query and the plurality of search results based on an MLP.

Figure 7:
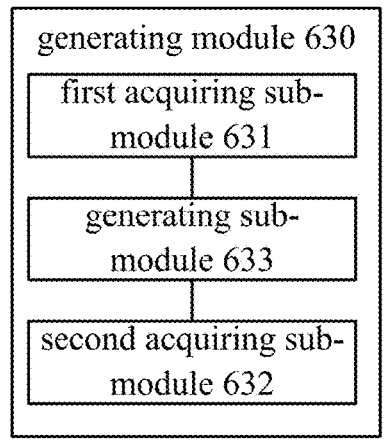
FIG. 7 is a block diagram of a generating module according to an embodiment of the present disclosure.

As an example, as shown in FIG. 7, the generating module 630 may include a first acquiring sub-module 631, a second acquiring sub-module 632 and a generating sub-module 633. The first acquiring sub-module 631 is configured to acquire an intersection set including one or more segments contained in both the query and the pre-query, a first difference set including one or more segments contained in the query but not contained in the pre-query, a second difference set including one or more segments contained in the pre-query but not contained in the query and a union set including one or more segments contained in the query or the pre-query. The second acquiring sub-module 632 is configured to acquire a set of one or more segments and a search identifying set corresponding to the plurality of search results, in which the search identifying set is configured to indicate whether the plurality of search results are comprised in a click set of the pre-query, a non-click set of the pre-query or a non-display set of the pre-query. The generating sub-module 633 is configured to generate the target term vector representation according to the query, the pre-query, the intersection set, the first difference set, the second difference set, the union set, the set of the one or more segments and the search identifying set corresponding to the plurality of search results based on the MLP.

Figure 8:
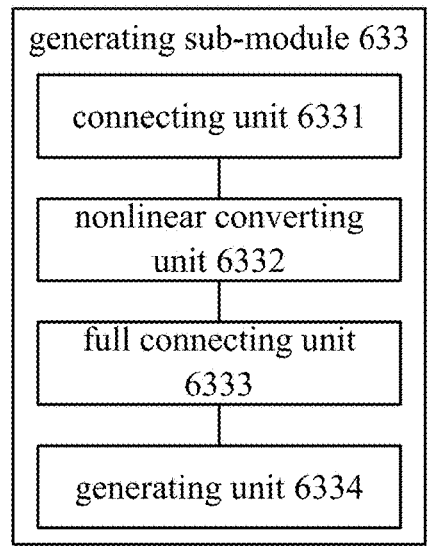
FIG. 8 is a block diagram of a generating sub-module according to an embodiment of the present disclosure.

As an example, the MLP includes a connect layer, a softsign layer, an FC layer and an MLP layer. In this example, as shown in FIG. 8, the generating sub-module 633 may include a connecting unit 6331, a nonlinear converting unit 6332, a full connecting unit 6333 and a generating unit 6334.

The connecting unit 6331 is configured to connect the query, the pre-query, the intersection set, the first difference set, the second difference set and the union set as a term vector of query via the connect layer.

The nonlinear converting unit 6332 is configured to perform a nonlinear conversion on the term vector of the query via the softsign layer.

The full connecting unit 6333 is configured to perform a full connection on a nonlinear converted term vector of the query via the FC layer so as to generate a representation of the term vector of the query.

The connecting unit 6331 is further configured to connect the set of the one or more segments and the search identifying set corresponding to the plurality of search results as a term vector of the plurality of search results via the connect layer.

The nonlinear converting unit 6332 is further configured to perform the nonlinear conversion on the term vector of the plurality of search results via the softsign layer.

The full connecting unit 6333 is further configured to perform the full connection on a nonlinear converted term vector of the plurality of search results via the FC layer so as to generate a representation of the term vector of the plurality of search results.

The generating unit 6334 is configured to generate the target term vector representation according to the representation of the term vector of the query and the representation of the term vector of the plurality of search results via the MLP layer.

The forecasting module 640 is configured to forecast the target term vector representation based on a semantic model of a deep neural network so as to acquire a plurality of optimized search results corresponding to the query.

Figure 9:
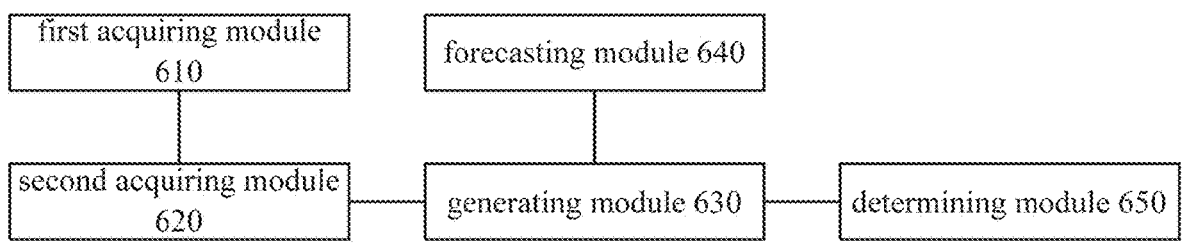
FIG. 9 is block diagram of a searching apparatus based on a neural network according to another embodiment of the present disclosure.

In order to improve the accuracy of the searching results and to acquire the better effect of personal search optimizing, in an embodiment of the present disclosure, as shown in FIG. 9, the searching apparatus also includes: a determining module 650, configured to determine a relation between the query and the pre-query. In an embodiment of the present disclosure, the generating module 630 is configured to generate the target term vector representation according to the relation, the query, the pre-query and the plurality of search results based on the MLP.

Figure 10:
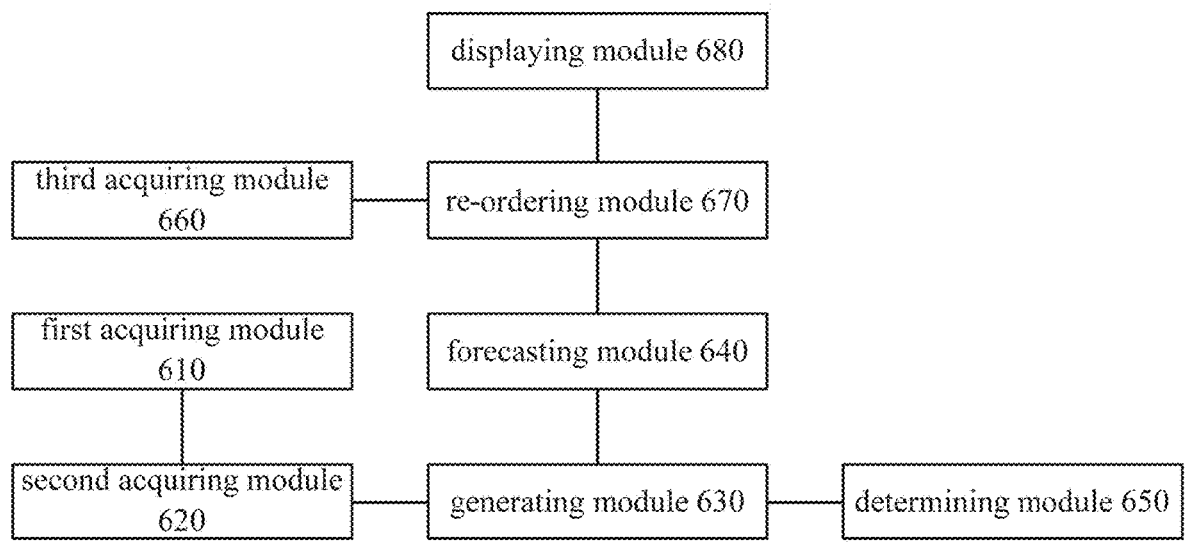
FIG. 10 is block diagram of a searching apparatus based on a neural network according to yet another embodiment of the present disclosure.

In order to improve the experience for the user and to acquire the better effect of personal search optimizing, in embodiments of the present disclosure, as shown in FIG. 10, the searching apparatus also includes a third acquiring module 660, a re-ordering module 670 and a displaying module 680. The third acquiring module 660 is configured to acquire context information of the query after the plurality of optimized search results corresponding to the query are acquired. The re-ordering module 670 is configured to re-order the plurality of optimized search results according to the context information. The displaying module 680 is configured to display the plurality of optimized search results re-ordered in a search result page.

With the searching apparatus based on the neural network according to embodiments of the present disclosure, the query and the pre-query input by the user may be acquired by the first acquiring module, the plurality of search results may be acquired by the second acquiring module according to the query, the target term vector representation may be generated by the generating module thereafter according to the query, the pre-query and the plurality of search results based on an MLP, and finally, the target term vector representation may be forecasted by the forecasting module based on a semantic model of a deep neural network so as to acquire the plurality of optimized search results corresponding to the query. In other words, a search optimizing may be performed on the query according to the pre-query, and the search result and an order matching the user's short-term requirement may be acquired using an advantage of the neural network on semantic understanding, such that a personal requirement of the user may be satisfied in a maximal degree, accuracy of the search result may be improved and a searching experience of the user may be improved significantly.

In order to achieve the above embodiments, the present disclosure also provides a search engine including any of implementations of the searching apparatus described above.

With the search engine based on the neural network according to embodiments of the present disclosure, the query and the pre-query input by the user may be acquired by the first acquiring module in the search engine, the plurality of search results may be acquired by the second acquiring module according to the query, the target term vector representation may be generated by the generating module thereafter according to the query, the pre-query and the plurality of search results based on an MLP, and finally, the target term vector representation may be forecasted by the forecasting module based on a semantic model of a deep neural network so as to acquire the plurality of optimized search results corresponding to the query. In other words, a search optimizing may be performed on the query according to the pre-query, and the search result and an order matching the user's short-term requirement may be acquired using an advantage of the neural network on semantic understanding, such that a personal requirement of the user may be satisfied in a maximal degree, accuracy of the search result may be improved and a searching experience of the user may be improved significantly.

Those skilled in the art shall understand that terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

It will be understood that, the flow chart or any process or method described herein in other manners may represent a module, segment, or portion of code that comprises one or more executable instructions to implement the specified logic function(s) or that comprises one or more executable instructions of the steps of the progress. And the scope of a preferred embodiment of the present disclosure includes other implementations in which the order of execution may differ from that which is depicted in the flow chart, which should be understood by those skilled in the art.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that the various parts of the present disclosure may be realized by hardware, software, firmware or combinations thereof. In the above embodiments, a plurality of steps or methods may be stored in a memory and achieved by software or firmware executed by a suitable instruction executing system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable memory medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable memory medium.

The above-mentioned memory medium may be a read-only memory, a magnetic disc, an optical disc, etc. Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A searching method based on a neural network, comprising:
   acquiring a query and a pre-query input by a user;
   acquiring a plurality of search results according to the query;
   generating a target term vector representation according to the query, the pre-query and the plurality of search results based on a Multi-layer Perceptron (MLP); and
   forecasting the target term vector representation based on a semantic model of a deep neural network so as to acquire a plurality of optimized search results corresponding to the query;
   wherein generating a target term vector representation according to the query, the pre-query and the plurality of search results based on an MLP comprises:
   acquiring an intersection set including one or more segments contained in both the query and the pre-query, a first difference set including one or more segments contained in the query but not contained in the pre-query, a second difference set including one or more segments contained in the pre-query but not contained in the query and a union set including one or more segments contained in the query or the pre-query;
   acquiring a set of one or more segments and a search identifying set corresponding to the plurality of search results, wherein the search identifying set is configured to indicate whether the plurality of search results are comprised in a click set of the pre-query, a non-click set of the pre-query or a non-display set of the pre-query; and
   generating the target term vector representation according to the query, the pre-query, the intersection set, the first difference set, the second difference set, the union set, the set of the one or more segments and the search identifying set corresponding to the plurality of search results based on the MLP.

2. The searching method according to claim 1, wherein the MLP comprises a connect layer, a softsign layer, an FC layer and an MLP layer, and generating the target term vector representation according to the query, the pre-query, the intersection set, the first difference set, the second difference set, the union set, the set of the one or more segments and the search identifying set corresponding to the plurality of search results based on the MLP comprises:
   connecting the query, the pre-query, the intersection set, the first difference set, the second difference set and the union set as a term vector of the query via the connect layer;
   performing a nonlinear conversion on the term vector of the query via the softsign layer, and performing a full connection on a nonlinear converted term vector of the query via the FC layer so as to generate a representation of the term vector of the query;
   connecting the set of the one or more segments and the search identifying set corresponding to the plurality of search results as a term vector of the plurality of search results via the connect layer;
   performing the nonlinear conversion on the term vector of the plurality of search results via the softsign layer, and performing the full connection on a nonlinear converted term vector of the plurality of search results via the FC layer so as to generate a representation of the term vector of the plurality of search results; and
   generating the target term vector representation according to the representation of the term vector of the query and the representation of the term vector of the plurality of search results via the MLP layer.

3. The searching method according to claim 1, further comprising:
   determining a relation between the query and the pre-query;
   wherein generating a target term vector representation according to the query, the prequery and the plurality of search results based on an MLP comprises:
   generating the target term vector representation according to the relation, the query, the pre-query and the plurality of search results based on the MLP.

4. The searching method according to claim 1, further comprising:
   determining a relation between the query and the pre-query;
   wherein generating a target term vector representation according to the query, the prequery and the plurality of search results based on an MLP comprises:
   generating the target term vector representation according to the relation, the query, the pre-query and the plurality of search results based on the MLP.

5. The searching method according to claim 2, further comprising:
   determining a relation between the query and the pre-query;
   wherein generating a target term vector representation according to the query, the prequery and the plurality of search results based on an MLP comprises:
   generating the target term vector representation according to the relation, the query, the pre-query and the plurality of search results based on the MLP.

6. The searching method according to claim 1, wherein after the plurality of optimized search results corresponding to the query are acquired, the searching method further comprises:
   acquiring context information of the query;
   re-ordering the plurality of optimized search results according to the context information; and
   displaying the plurality of optimized search results re-ordered in a search result page.

7. The searching method according to claim 1, wherein after the plurality of optimized search results corresponding to the query are acquired, the searching method further comprises:
   acquiring context information of the query;
   re-ordering the plurality of optimized search results according to the context information; and
   displaying the plurality of optimized search results re-ordered in a search result page.

8. The searching method according to claim 2, wherein after the plurality of optimized search results corresponding to the query are acquired, the searching method further comprises:
   acquiring context information of the query;
   re-ordering the plurality of optimized search results according to the context information; and
   displaying the plurality of optimized search results re-ordered in a search result page.

9. A searching apparatus based on a neural network, comprising: one or more processors;
   a memory storing instructions executable by the one or more processors;
   wherein the one or more processors are configured to:
   acquire a query and a pre-query input by a user;
   acquire a plurality of search results according to the query;
   generate a target term vector representation according to the query, the pre-query and the plurality of search results based on a Multi-layer Perceptron (MLP); and
   forecast the target term vector representation based on a semantic model of a deep neural network so as to acquire a plurality of optimized search results corresponding to the query;
   wherein the one or more processors are configured to perform following acts to generate a target term vector representation according to the query, the pre-query and the plurality of search results based on an MLP:
   acquiring an intersection set including one or more segments contained in both the query and the pre-query, a first difference set including one or more segments contained in the query but not contained in the pre-query, a second difference set including one or more segments contained in the pre-query but not contained in the query and a union set including one or more segments contained in the query or the pre-query;
   acquiring a set of one or more segments and a search identifying set corresponding to the plurality of search results, wherein the search identifying set is configured to indicate whether the plurality of search results are comprised in a click set of the pre-query, a non-click set of the pre-query or a non-display set of the pre-query; and
   generating the target term vector representation according to the query, the pre-query, the intersection set, the first difference set, the second difference set, the union set, the set of the one or more segments and the search identifying set corresponding to the plurality of search results based on the MLP.

10. The searching apparatus according to claim 9, wherein the MLP comprises a connect layer, a softsign layer, an FC layer and an MLP layer, and the one or more processors are configured to perform following acts to generate the target term vector representation according to the query, the pre-query, the intersection set, the first difference set, the second difference set, the union set, the set of the one or more segments and the search identifying set corresponding to the plurality of search results based on the MLP:
    connecting the query, the pre-query, the intersection set, the first difference set, the second difference set and the union set as a term vector of query via the connect layer, and connecting the set of the one or more segments and the search identifying set corresponding to the plurality of search results as a term vector of the plurality of search results via the connect layer;
    performing a nonlinear conversion on the term vector of the query via the softsign layer, and performing the nonlinear conversion on the term vector of the plurality of search results via the softsign layer;
    performing a full connection on a nonlinear converted term vector of the query via the FC layer so as to generate a representation of the term vector of the query, and performing the full connection on a nonlinear converted term vector of the plurality of search results via the FC layer so as to generate a representation of the term vector of the plurality of search results; and
    generating the target term vector representation according to the representation of the term vector of the query and the representation of the term vector of the plurality of search results via the MLP layer.

11. The searching apparatus according to claim 9, wherein the one or more processors are further configured to:
    determine a relation between the query and the pre-query;
    wherein the generating module is configured to generate the target term vector representation according to the relation, the query, the pre-query and the plurality of search results based on the MLP.

12. The searching apparatus according to claim 9, wherein the one or more processors are further configured to:
  determine a relation between the query and the pre-query;
  wherein the generating module is configured to generate the target term vector representation according to the relation, the query, the pre-query and the plurality of search results based on the MLP.

13. The searching apparatus according to claim 10, wherein the one or more processors are further configured to:
  determine a relation between the query and the pre-query;
  wherein the generating module is configured to generate the target term vector representation according to the relation, the query, the pre-query and the plurality of search results based on the MLP.

14. The searching apparatus according to claim 9, wherein the one or more processors are further configured to:
  acquire context information of the query after the plurality of optimized search results corresponding to the query are acquired;
  re-order the plurality of optimized search results according to the context information; and
  display the plurality of optimized search results re-ordered in a search result page.

15. The searching apparatus according to claim 9, wherein the one or more processors are further configured to:
  acquire context information of the query after the plurality of optimized search results corresponding to the query are acquired;
  re-order the plurality of optimized search results according to the context information; and
  display the plurality of optimized search results re-ordered in a search result page.

16. The searching apparatus according to claim 10, wherein the one or more processors are further configured to:
  acquire context information of the query after the plurality of optimized search results corresponding to the query are acquired;
  re-order the plurality of optimized search results according to the context information; and
  display the plurality of optimized search results re-ordered in a search result page.

17. A search engine, comprising: the searching apparatus based on a neural network comprising:
  one or more processors;
  a memory storing instructions executable by the one or more processors;
  wherein the one or more processors are configured to:
  acquire a query and a pre-query input by a user;
  acquire a plurality of search results according to the query;
  generate a target term vector representation according to the query, the pre-query and the plurality of search results based on a Multi-layer Perceptron (MLP); and
  forecast the target term vector representation based on a semantic model of a deep neural network so as to acquire a plurality of optimized search results corresponding to the query;
  wherein the one or more processors are configured to perform following acts to generate a target term vector representation according to the query, the pre-query and the plurality of search results based on an MLP:
  acquiring an intersection set including one or more segments contained in both the query and the pre-query, a first difference set including one or more segments contained in the query but not contained in the pre-query, a second difference set including one or more segments contained in the pre-query but not contained in the query and a union set including one or more segments contained in the query or the pre-query;
  acquiring a set of one or more segments and a search identifying set corresponding to the plurality of search results, wherein the search identifying set is configured to indicate whether the plurality of search results are comprised in a click set of the pre-query, a non-click set of the pre-query or a non-display set of the pre-query; and
  generating the target term vector representation according to the query, the pre-query, the intersection set, the first difference set, the second difference set, the union set, the set of the one or more segments and the search identifying set corresponding to the plurality of search results based on the MLP.

* * * * *